Sept. 12, 1933.   A. HOFFMANN   1,926,484
METHOD AND APPARATUS FOR EMULSIFYING
Filed May 29, 1931
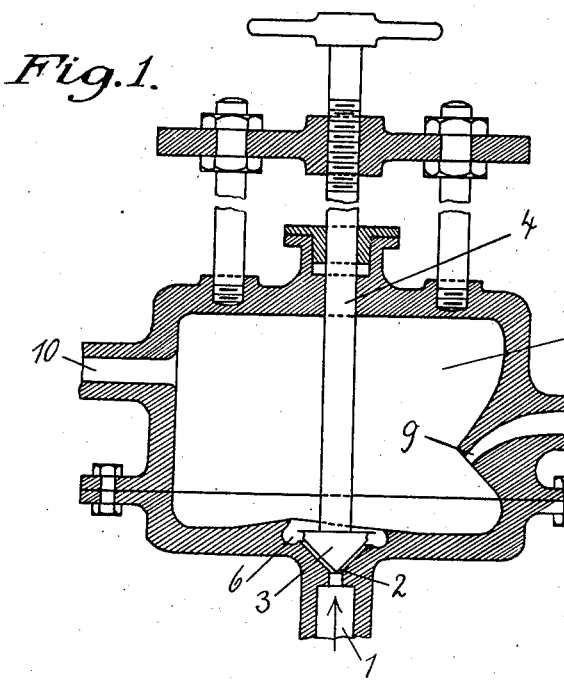
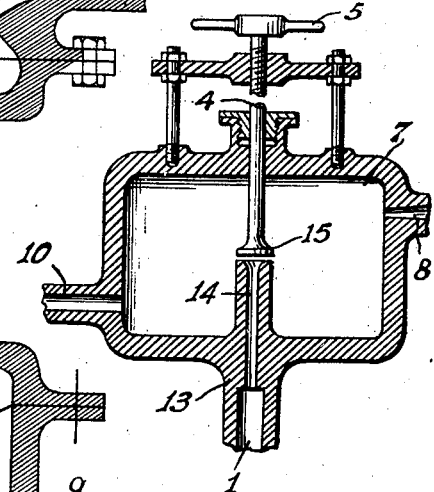
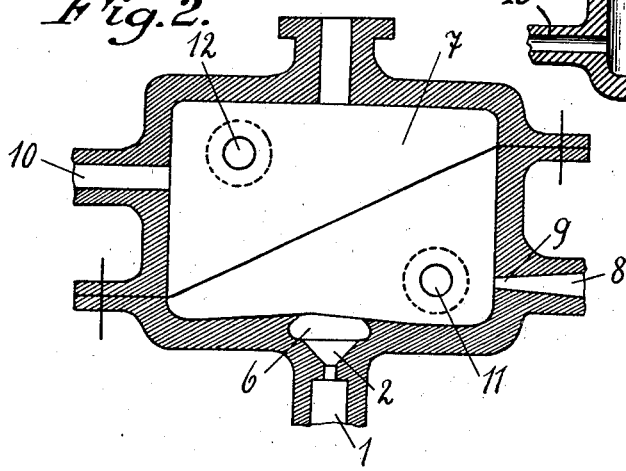

Patented Sept. 12, 1933

1,926,484

UNITED STATES PATENT OFFICE 1,926,484

METHOD AND APPARATUS FOR EMULSIFYING

Alfred Hoffmann, Berlin, Germany

Application May 29, 1931, Serial No. 540,970, and in Germany April 23, 1930

6 Claims. (Cl. 99—11)

This invention concerns a process and a mechanism for the production of emulsions, especially those of milk and fat, or oil. In the mechanical processes utilized up to the present for enriching milk by the addition of fats or oils, the ingredients are usually applied separately to the homogenizing apparatus, and are subject to the influence of a rapidly revolving mechanism of a centrifugal type. In this manner, however, a thoroughly equalized emulsion of milk and fat can only be very incompletely obtained, as the fat or oil cannot be separated into particles of anything like equality in size, but is for the greater part thrown off in the form of such large drops that the combination with the milk is either only imperfect or else does not take place at all.

It has also been proposed to produce emulsions in such a manner that the liquids to be mixed are pressed together by means of a friction-like mechanism with a circular movement, working under the pressure of the liquid, in order to bring about a thorough mixture of the ingredients in this way.

By means of this invention and the mechanism hereinafter described, the liquid forming the disperse phase, for example, the fat or the oil, and which is injected in the described manner under high pressure through a nozzle into the liquid forming the continual phase, for example the milk shall, without the application of any mechanically operated means, be distributed in such a manner upon a level surface or upon a cone-shaped extending surface when leaving the mouth of the nozzle, that the particles of the disperse phase are separated in distance as far as is possible from each other. At the same time this separation takes place within a space of such a size and under such a pressure it is injected into the liquid forming the continual phase, that a homogeneous emulsion is thereby produced.

By means of experiments, the inventor has ascertained that owing to such an extensive separation of the particles of the disperse phase upon a flat surface or upon a cone-shaped extending surface, the said particles and the liquid forming the emulsion mix together with each other much easier than when the liquid flows from the nozzle in a closed and weak cone-shaped jet in the usual manner.

The manner in which the atomization is effected is of great importance for the success of the process. An injection of the jet of oil or fat through one or more fine nozzles which, for a sufficiently fine separation of the jet can only be of some hundredths part of a millimetre in diameter, does not facilitate a sufficiently equal separation of the jet of fat, as in such manner the jet consists of small drops of a fine nebulous character, which increase in size towards the centre of the jet. Such a process therefore offers similar disadvantages to the centrifugal system, especially in view of the inevitable wear and tear in the nozzle of the jet, which, within a short time, sets in. A further considerable disadvantage in the use of such fine nozzles is that these easily become choked up and therefore give rise to constant working impediments and interruptions.

According to this invention, the pressure of the oil or fat into the emulsion chamber is not effected in the form of a compact jet, but in such a manner that, by atomization it is distributed in the shape of an even surface, and thus it forms an emulsion with the milk. This manner of procedure offers the advantage that the small particles of milk, in passing through the fine layer consisting of thinly distributed particles of oil or fat, enrich this layer easily and safely, so that in this manner perfect equality in the size of the particles is obtained, a point which is of the greatest importance in the efficiency of this process. In addition thereto, the process as carried out, according to this invention, offers the great advantage that the fineness of the atomization, and thereby the size of the separated particles, remains under permanent observation and can be regulated as desired to any required degree throughout the operation. In this manner such interruptions and impediments in the course of the work as those occurring when fine nozzles are used are entirely eliminated.

A particularly favorable effect will be obtained when the jet of milk is directed against the current upon the small particles of oil and fat as these extend outwards in the form of an even surface. A further increase in the emulsion effectivity, according to this process, may be obtained by arranging the atomizing mechanism in such a manner that the flat formed jet of oil or fat operates with a circular movement.

For carrying out this process, a practical atomizing mechanism is utilized in the shape of a disc valve, which may be regulated in height to a fine degree, and which is provided with a cone shaped seat.

The inlet for the milk, as well as the outlet for the emulsion, according to this invention, are both provided with a throttling apparatus, not only in order to regulate the rapidity of the flow of milk at the inlet, but also, by throttling the speed of the emulsion at the outlet, in order to produce a certain counter-pressure in the emulsion chamber, should this be found necessary.

The accompanying designs serve to illustrate the manner in which this process is carried out.

Figure 1 is a vertical section of the emulsion chamber, the disperse phase entering the chamber from underneath, while the liquid flows in continually from the side.

Figure 2 shows another form of construction of the emulsion chamber, according to Figure 1.

Figure 3 is another vertical section of a third form of construction of the mechanism, wherein the tube which conducts the liquid to be atomized is carried up into the centre of the chamber, where it is closed by means of a disc valve.

According to Figures 1 and 2, the introduction of the fats or oils is effected under high pressure from the chamber 1 to the nozzle 2, the opening of which may be regulated by means of the adjustment of the cone 3. The cone 3 forms the seat of the valve 4, the upper part of which is provided with a screw, so that by turning the hand wheel 5 the adjustment between the cone 3 and the nozzle 2 may be regulated to a high degree of nicety. The nozzle rim 6 may be so formed that the small particles of fat injected through the nozzle 2 into the chamber 7, which is always filled with milk, are caused to have a circular or spiral movement. At the same time the milk enters the chamber 7 through the opening 8, and the end of the inlet 8 may be of a nozzle-like form 9, so that the milk is introduced into the chamber in the opposite direction to that of the small particles of fat circulating within the chamber, thereby producing a thorough and complete mixture of the milk with the said particles. The emulsion leaves the chamber 7 through the opening 10. In the tube or conduit connected with the opening 10 a throttle will be built in (this is not shown in the designs), so that only after a sufficiently high emulsion has been produced the mixture may be drawn off.

In order to bring about the counter-current principle inside the chamber 7, the interior walls or the spindle 5 may be provided with the necessary contrivances, for example with spiral baffle pieces or the like, by means of which an increase in the rotation of the emulsion is brought about.

By means of glass observation holes 11 and 12, in the chamber 7, the complete process of emulsion may be under constant observaiton from the moment in which the milk is introduced into the chamber until the complete emulsion has been produced. Thus both inlet and outlet may be regulated to a high degree of nicety at any moment.

The chamber 7 will be suitably constructed so that it may be dismounted in order to be thoroughly cleaned. The chamber 7 may also be fitted with a heating installation, in order that the most favorable temperature for the emulsion may be maintained throughout the whole process. The heat may be produced by hot water, steam, electricity, or the like.

According to Figure 3, the connecting tube adjusted to the high compressor chamber 1 is carried to about the middle of the chamber 7, ending in a level surface above which the valve 4 with the flat seat 15 is adjustable. By this means the jet of oil or fat is not cone-shaped but is spread out in circular form and in a flat direction, thereby offering to the oppositely flowing milk a particularly broad surface, thus further improving the emulsioning effect. In Figure 3 the tube 8 which serves to conduct the milk into the chamber 7 may also end at a tangent to the cylindrical wall of the chamber 7, whereby the milk will be set into a whirling movement about the atomizing mechanism 2 and 3 in Figures 1 and 2, and 14 and 15 in Figure 3.

Experiments have proved that the mechanism herein represented and described is not only suitable for the production of emulsions of milk with fat or oil, but that it may also be utilized with the greatest success for the production of all other kinds of emulsions, particularly for such as are used in the pharmaceutical and cosmetic industries.

In order that the atomizing mechanism be of sufficient efficiency and that it may correspond to the requirements of high pressure with which the liquid to be dispersed must be forced into the chamber 7 from the pressure chamber 1, the said atomizing mechanism is to be suitably constructed of materials of high resistance, such as chrome-nickel steel, upon which the liquids used do not have any injurious effect nor produce any chemical action.

It will be observed that the chamber in which the emulsification is effected is of great cross-section area compared to the inlets so that ample room is afforded for wide dispersion of the dispersion phase material.

I claim:

1. That method of producing an emulsion of a plurality of liquid substances which consists in producing a thin widely dispersed and atomized sheet of one of the liquids and forcing the other liquid to flow thereagainst.

2. That method of producing an emulsion of a plurality of liquid substances which consists in injecting one liquid into a large chamber in such manner as to atomize said liquid and produce a widely dispersed thin sheet and simultaneously injecting the remaining liquid into said chamber against said sheet.

3. That method of producing an emulsion of a plurality of liquid substances which consists in injectng one liquid under high pressure into a large chamber in such manner as to atomize said liquid and produce a widely dispersed thin sheet and simultaneously injecting the other liquid under low pressure into said chamber against said sheet.

4. In an emulsion forming apparatus, a chamber having an axial inlet and a lateral inlet, said chamber also having an outlet, and an atomizing nozzle at said axial inlet arranged to effect wide dispersion of a fluid in the form of a thin sheet.

5. In an emulsion forming apparatus, a chamber having an axial inlet and a lateral inlet, said chamber also having an outlet, and an atomizing nozzle at said axial inlet arranged to effect wide dispersion of a fluid in the form of a thin flatly conical sheet.

6. In an emulsion forming apparatus, a chamber having an axial inlet and a lateral inlet, said chamber also having an outlet, and an atomizing nozzle at said axial inlet arranged to effect wide dispersion of a fluid in the form of a thin disk-like sheet.

ALFRED HOFFMANN.